(12) United States Patent
Nagel et al.

(10) Patent No.: US 7,241,427 B2
(45) Date of Patent: *Jul. 10, 2007

(54) CATALYST CARRIER BODY WITH SLEEVE AND SHORTENED TUBULAR JACKET AND CATALYTIC CONVERTER HAVING THE CATALYST CARRIER BODY

(75) Inventors: Thomas Nagel, Engelskirchen (DE); Hans-Günter Faust, Köln (DE); Ludwig Wieres, Overath (DE); Wolfgang Maus, Bergisch Gladbach (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 551 days.

This patent is subject to a terminal disclaimer.

(21) Appl. No.: 10/234,548

(22) Filed: Sep. 4, 2002

(65) Prior Publication Data
US 2003/0007906 A1   Jan. 9, 2003

Related U.S. Application Data

(63) Continuation of application No. PCT/EP01/04221, filed on Apr. 12, 2001.

(30) Foreign Application Priority Data
Apr. 14, 2000  (DE) .................... 101 18 640

(51) Int. Cl.
 *B01D 50/00* (2006.01)
(52) U.S. Cl. .................................... 422/180
(58) Field of Classification Search ............... 422/177, 422/180; 428/593–594
See application file for complete search history.

(56) References Cited

U.S. PATENT DOCUMENTS 5,272,875 A * 12/1993  Kaji ........................... 422/180

(Continued)

FOREIGN PATENT DOCUMENTS

DE          36 03 882 A1     8/1986

(Continued)

*Primary Examiner*—Glenn Caldarola
*Assistant Examiner*—Tom P. Duong
(74) *Attorney, Agent, or Firm*—Laurence A. Greenberg; Werner H. Stemer; Ralph E. Locher

(57) ABSTRACT

A catalyst carrier body includes a honeycomb body having sheet-metal layers and an axial extent. The sheet-metal layers are at least partly structured in such a way that the honeycomb body has passages through which an exhaust gas can flow. The sheet-metal layers of the honeycomb body have end regions lying radially outwardly. A tubular jacket has an edge and an axial span shorter than the axial extent of the honeycomb body. The tubular jacket is connected to the honeycomb body in at least one axial partial-region by a joining technique. A sleeve has an axial length shorter than the axial extent of the honeycomb body and is disposed on an outer region of the honeycomb body, in the vicinity of an end surface. The sleeve has an inner shell surface connected by a joining technique to the end regions of the sheet-metal layers at the end surfaces. The honeycomb body projects beyond an edge of the tubular jacket in a projecting section surrounded by the sleeve. In this way, stresses between the honeycomb body and the tubular jacket are avoided even with high thermal loads on the catalyst carrier body. A catalytic converter having the catalyst carrier body is also provided.

20 Claims, 4 Drawing Sheets

U.S. PATENT DOCUMENTS 5,456,890 A * 10/1995 Tsai et al. .................... 422/180
5,795,658 A *  8/1998 Bode et al. ................... 428/593
6,497,039 B1 * 12/2002 Wieres et al. ................. 29/890

FOREIGN PATENT DOCUMENTS

| EP | 0 356 907 | 3/1990 |
| JP | 04029750 | 1/1992 |
| JP | 06154621 | 6/1994 |
| WO | 95/16110 | 6/1995 |
| WO | 99/37896 | 7/1999 |

* cited by examiner

CATALYST CARRIER BODY WITH SLEEVE AND SHORTENED TUBULAR JACKET AND CATALYTIC CONVERTER HAVING THE CATALYST CARRIER BODY

CROSS-REFERENCE TO RELATED APPLICATION

This application is a continuation of copending International Application No. PCT/EP01/04221, filed Apr. 12, 2001, which designated the United States and was not published in English.

BACKGROUND OF THE INVENTION

Field of the Invention

The present invention relates to a catalyst carrier body having a honeycomb body, a tubular jacket and a sleeve which is disposed around the honeycomb body. Such catalyst carrier bodies are preferably used in exhaust systems of internal-combustion engines, in particular of motor vehicles. The present invention also relates to a catalytic converter having the catalyst carrier body, in particular for cleaning exhaust gas from an internal-combustion engine.

International Publication No. WO 99/37896 describes a process for producing an enclosed honeycomb body. That honeycomb body has sheet-metal layers, which are at least partly structured in such a way that the honeycomb body has passages through which a fluid can flow. The honeycomb body is surrounded by a tubular jacket. The honeycomb body and the tubular jacket have different thermal expansion performances due to their different materials properties and their different operating temperatures. A connection which, if appropriate, allows relative movement between the honeycomb body and the tubular jacket is desired, in order to prevent thermal stresses between the honeycomb body and the tubular jacket.

For that purpose, the honeycomb body is constructed with a sleeve which is intended to ensure that direct brazed joints between the honeycomb body and the tubular jacket are avoided in at least one end region of the honeycomb body, despite manufacturing tolerances of the tubular jacket and the honeycomb body. In the known prior art, sleeves of that type are connected either only to the honeycomb body or only to the tubular jacket. In that way, relative movement is allowed between the unconnected part of the honeycomb body with respect to the tubular jacket or the sleeve. Those honeycomb bodies with a sleeve are preferably oriented in an exhaust system in such a way that the sleeve is oriented upstream, toward the hot exhaust gas, so that it is possible to compensate for the particularly high thermal loads which occur in that region. A process for producing a catalyst carrier body of that type requires particular care when attaching the sleeve to the honeycomb body or to the tubular jacket, in order to simply obtain the desired connection using a joining technique. If that cannot be ensured, thermal stresses during operation may lead to a reduced service life of the catalyst carrier body.

Furthermore, a metal carrier body for a converter for exhaust-gas cleaning in which the tubular jacket and the honeycomb body are disposed axially offset with respect to one another, is known from German Published, Non-Prosecuted Patent Application DE 36 03 882 A1. In that case, the honeycomb body projects beyond a limit of the tubular jacket in an upstream direction. The honeycomb body includes layers of smooth and corrugated or wavy, heat-resistant sheet metal layers, in particular with a thickness of from 0.015 to 0.06 mm. The layers are alternately layered on top of one another and are brazed to one another. In addition to the high thermal loads, converters are also exposed to high dynamic loads. Under such dynamic loads, radially outer end regions of the sheet-metal layers which are not surrounded by a housing can become detached from the brazed assembly and begin to flap. That flapping causes increasing numbers of brazed joints to become detached, the catalytically active surface to become detached from the sheet metal layers and the efficiency of a catalytic converter of that type to decrease.

SUMMARY OF THE INVENTION

It is accordingly an object of the invention to provide a catalyst carrier body with a sleeve and a shortened tubular jacket and a catalytic converter having the catalyst carrier body, which overcome the hereinafore-mentioned disadvantages of the heretofore-known devices of this general type, which have a long service life, which have a simple structure and which nevertheless avoid thermal stresses between the tubular jacket and a honeycomb body even under high thermal and dynamic loads.

With the foregoing and other objects in view there is provided, in accordance with the invention, a catalyst carrier body, comprising a honeycomb body made from sheet-metal layers being at least partly structured in such a way that the honeycomb body has passages through which an exhaust gas can flow. The sheet-metal layers of the honeycomb body have radially outer end regions. A tubular jacket has an axial span shorter than an axial extent of the honeycomb body. The tubular jacket is connected to the honeycomb body in at least one axial partial-region through the use of a joining technique. A sleeve is disposed at an outer region in the vicinity of an end surface of the honeycomb body. The sleeve has an axial length which is shorter than the axial extent of the honeycomb body. The sleeve has an inner shell surface connected through the use of a joining technique to the radially outer end regions of the sheet-metal layers lying at the end surface. The catalyst carrier body according to the invention is distinguished by the fact that the honeycomb body projects beyond the edge of the metal tubular jacket. This projecting section of the honeycomb body is surrounded by the sleeve.

The tubular jacket preferably has a thickness of between 0.5 and 2 mm, while the sleeve has a thickness of between 0.02 and 0.1 mm.

The sleeve is preferably constructed in such a manner that under thermal stress, at least in relation to expansion performance, it behaves in a manner similar to the sheet-metal layers of the honeycomb body. The catalyst carrier body according to the invention therefore allows thermal expansion of the projecting section of the honeycomb body under thermal load, while avoiding thermal stresses between the tubular jacket and the sleeve. In addition, the absence of the tubular jacket, which is relatively solid as compared to the sheet-metal layers, allows rapid heating of the projecting section, leading to a relatively short light-off or start-up time.

In accordance with another feature of the invention, the sleeve extends as far as the end surface of the honeycomb body and at least partially surrounds the entire circumference of the honeycomb body. In this way, the end regions of the sheet-metal layers are enclosed and flapping is prevented.

In accordance with a further feature of the invention, at least 10 mm, in particular at least 20 mm, of the axial length of the sleeve or of the axial extent of the honeycomb body, project beyond the edge of the tubular jacket. In particular, when a catalyst carrier body of this type is disposed in an exhaust system, most of the thermal energy is absorbed in this front region of the honeycomb body, since this is where the hot exhaust gas comes into contact with the honeycomb body. The projecting part of the honeycomb body having the sleeve can expand in a relatively unhindered manner, without significant compressive stresses being generated.

In accordance with an added feature of the invention, at most 20 mm, in particular at most 10 mm, of the axial length of the sleeve is surrounded by the tubular jacket. A balance can be struck between the thermal and dynamic performance of the converter according to the intended application or the configuration of a catalyst carrier body of this type in an exhaust system. For example, if only relatively low dynamic forces occur, the honeycomb body and the sleeve may project further beyond the tubular jacket and the time until the light-off temperature is reached can be reduced.

In accordance with an additional feature of the invention, the sleeve is connected to the tubular jacket through the use of a joining technique. In this case, it is particularly advantageous for the sleeve to be joined to the tubular jacket by high-temperature vacuum brazing. A joint of this type increases the stability of the catalyst carrier body.

In accordance with yet another feature of the invention, the sleeve has at least one microstructure which in particular has a structure height of from 0.04 to 0.2 mm. It is particularly advantageous for the at least one microstructure to have an encircling construction. The microstructure firstly makes the sleeve more rigid and therefore more stable with respect to deformation. Secondly, it helps to create defined connections between the honeycomb body and the sleeve or between the tubular jacket and the sleeve. In this way, brazing points which are adapted according to the application area of the catalyst carrier body are defined between the sleeve and the honeycomb body. The same applies to a connection between the sleeve and the tubular jacket using a joining technique. If there is no such connection between the sleeve and the tubular jacket, the frictional forces which occur between the tubular jacket and the sleeve during thermal expansion of the catalyst carrier body can be influenced.

In accordance with yet a further feature of the invention, a plurality of microstructures intersect one another. Therefore, virtually only punctiform contacts are produced between the adjacent components.

In accordance with yet an added feature of the invention, the at least one microstructure is disposed only in the direction of an outer shell surface of the sleeve. This allows a very stable connection between the sleeve and the sheet-metal layers of the honeycomb body, on one hand, and a very low coefficient of friction in the event of a relative movement between the sleeve and the tubular jacket, on the other hand.

In accordance with yet an additional feature of the invention, the honeycomb body is brazed to the tubular jacket, preferably by high-temperature vacuum brazing. Due to this joining method, a catalyst carrier body of this nature withstands even very high dynamic loads, which may occur, for example, as a result of a pulsating flow of exhaust gas.

In accordance with again another feature of the invention, the radially outer end regions of the sheet-metal layers, at the end surface, are brazed, preferably by high-temperature vacuum brazing, to the sleeve in the vicinity of one edge and at least in one encircling circumferential region of the inner shell surface. The brazing of the end regions of the sheet-metal layers to a completely encircling strip of the inner shell surface of the sleeve fixes each individual sheet-metal layer and therefore increases service life. In addition, the sheet-metal layers may be brazed together at the end surface in a manner which is known per se.

In accordance with again a further feature of the invention, the axial span of the tubular jacket and the axial length of the sleeve together are equal to the axial extent of the honeycomb body. In this way, exposed sheet-metal layers are avoided, while retaining the maximum possible freedom of expansion.

With the objects of the invention in view, there is also provided a catalytic converter, in particular for cleaning exhaust gas from an internal combustion engine, in which a catalyst carrier body of this type is integrated. In addition to the catalyst carrier body, the catalytic converter at least has a housing with a gas inlet. The catalyst carrier body is oriented with the projecting section of the honeycomb body or of the sleeve facing toward the gas inlet. This means that this region comes into contact with the hottest exhaust gas and is therefore exposed to the highest thermal load. This load can be compensated for very well due to the freedom of expansion.

In accordance with another feature of the invention, the catalyst carrier body is disposed in the vicinity of the gas inlet. In this case, the catalyst carrier body preferably serves as a preliminary catalytic converter which is distinguished in particular by very short light-off times. This means that the time which elapses after a cold start of the internal combustion engine until effective catalytic conversion of the exhaust gases on a correspondingly constructed surface of the catalytic converter, is reached. Further exhaust-gas cleaning components such as, for example, a three-way catalytic converter and/or a hydrocarbon absorber, are generally connected downstream of a preliminary catalytic converter of this type.

In accordance with a concomitant feature of the invention, the tubular jacket of the catalyst carrier body is connected to the housing through the use of a joining technique. In particular, a welded joint in the vicinity of a limit or border of the tubular jacket is advantageous, since a connection of this type allows thermal expansion of the honeycomb body and, if appropriate, dynamic vibrations.

Other features which are considered as characteristic for the invention are set forth in the appended claims.

Although the invention is illustrated and described herein as embodied in a catalyst carrier body with a sleeve and a shortened tubular jacket and a catalytic converter having the catalyst carrier body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
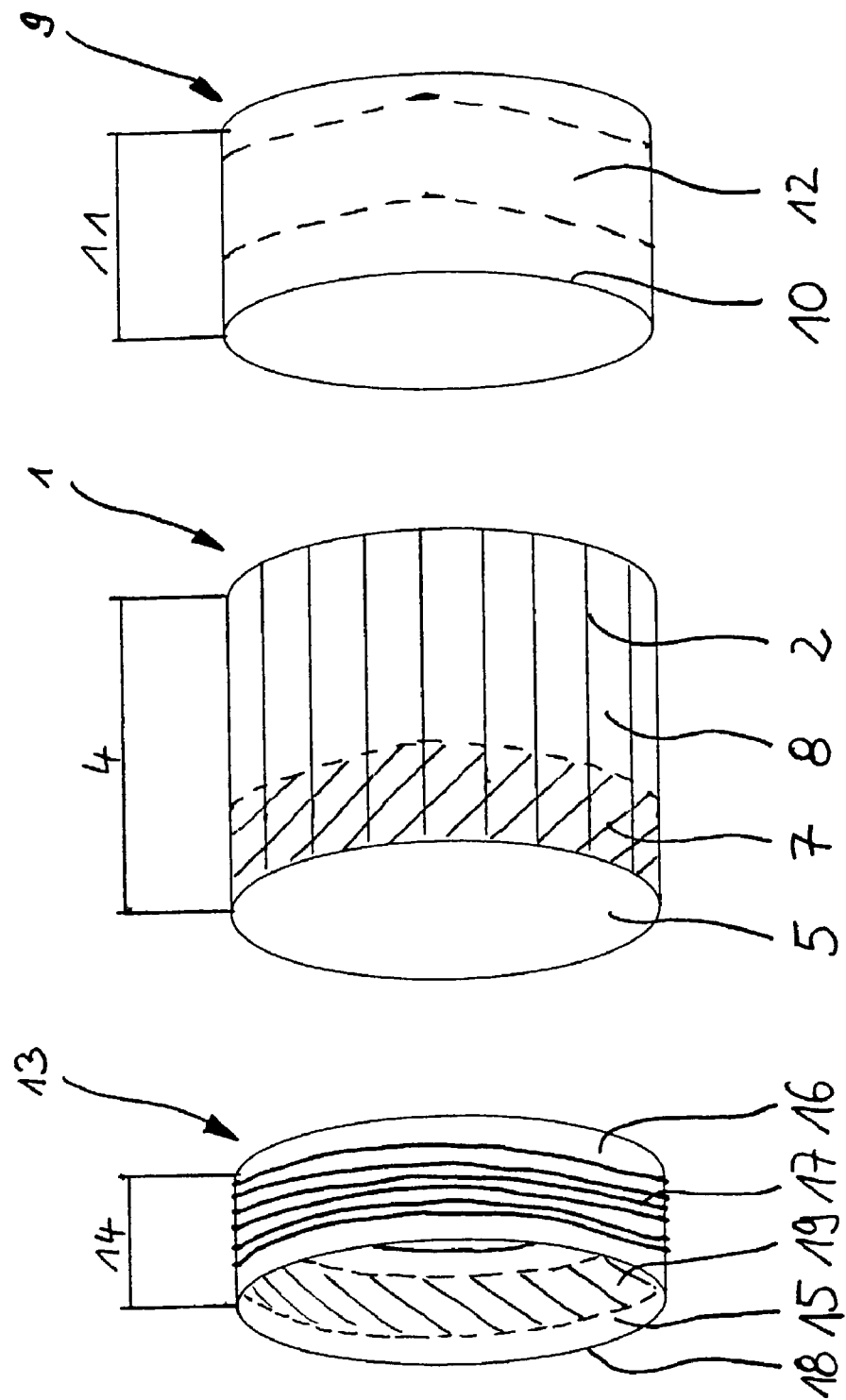
FIG. 1 is a diagrammatic, exploded, perspective view of a honeycomb body, sleeve and tubular jacket.

Referring now to the figures of the drawings in detail and first, particularly, to FIG. 1 thereof, there is seen a honeycomb body 1 with an end surface or side 5 and an axial extent 4. A section 7 is illustrated on an outer region 8 of the honeycomb body 1. According to the invention, the section 7 projects beyond an edge 10 of a tubular jacket 9 in an assembled state of a catalyst carrier body. Furthermore, ends of sheet-metal layers 2 can be seen on the outer region 8 of the honeycomb body 1.

The tubular jacket 9 has an axial span 11 and is connected to the honeycomb body 1, at least in an axial part region 12, by a joining technique.

A sleeve 13 has an axial length 14, an edge 18, an inner shell surface 15 and an outer shell surface 16. The sleeve 13 is connected to the honeycomb body 1 at a circumferential region 19 on the inner shell surface 15. The sleeve is disposed on the honeycomb body 1 in such a way that the edge 18 ends flush with the end surface 5 of the honeycomb body 1.

A plurality of encircling microstructures 17 are illustrated on the outer shell surface 16 of the sleeve 13. After the honeycomb body 1 together with the sleeve 13 has been introduced into the tubular jacket 9, the microstructures 17 have a significant influence on frictional forces which arise between the sleeve 13 and the tubular jacket 9 in the event of thermal expansion of the honeycomb body 1. Moreover, they stabilize the sleeve 13 against deformation.

Figure 2:
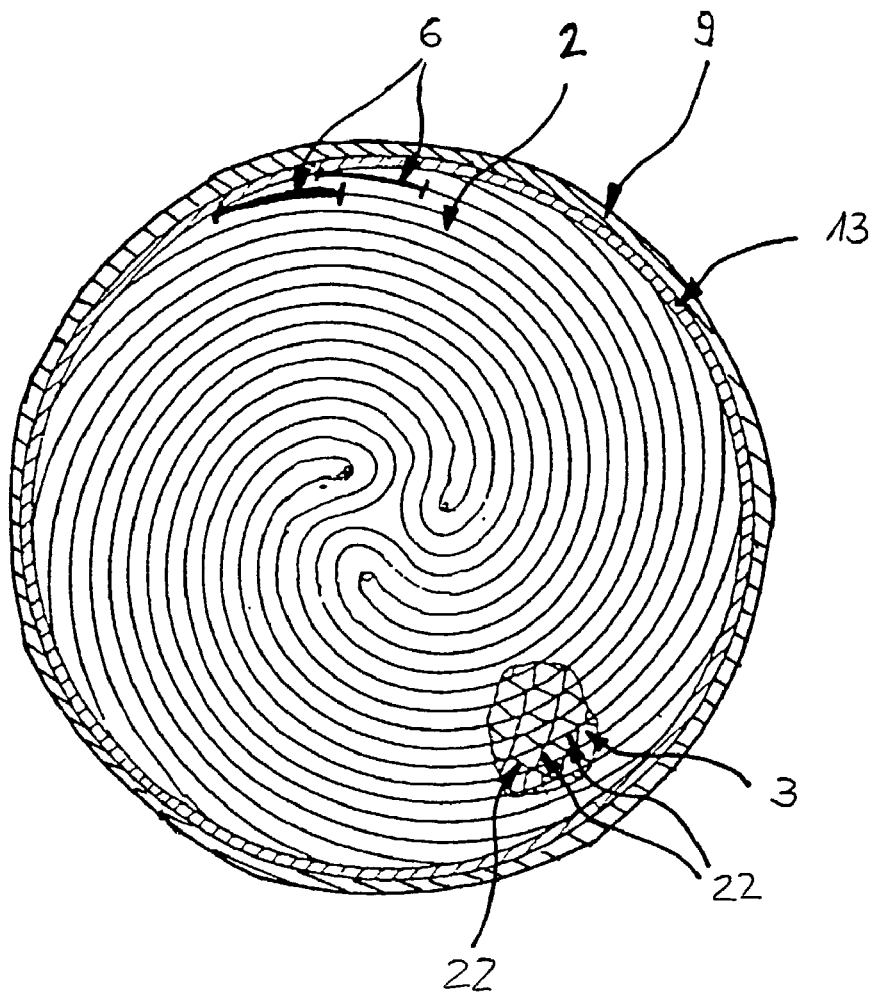
FIG. 2 is a partly-sectional, end-elevational view of an installed embodiment of a catalyst carrier body according to the invention.

FIG. 2 shows an end surface view of a catalyst carrier body according to the invention, having a tubular jacket 9, a sleeve 13 and a honeycomb body 1 produced from sheet-metal layers 2. The sheet-metal layers are at least partly structured or stacked and/or wound in such a way that the honeycomb body 1 has passages 3 through which an exhaust gas can flow. Radially outer end regions 6 of the sheet-metal layers 2 bear against the sleeve 13. It is particularly advantageous for end regions 6 of sheet metal layers 22 to be joined to the sleeve 13 by high-temperature vacuum brazing, with all of the end regions 6 being connected to the sleeve 13.

A catalyst carrier body constructed in this way can compensate for different thermal expansions of the honeycomb body 1 and the tubular jacket 9 when a thermal load is applied. This is due to the fact that the projecting section 7 of the honeycomb body can expand freely. The fact that the end regions 6 are connected to the sleeve 13 by a joining technique prevents the sheet-metal layers 2 from flapping, resulting in a particularly stable catalyst carrier body.

Figure 3:
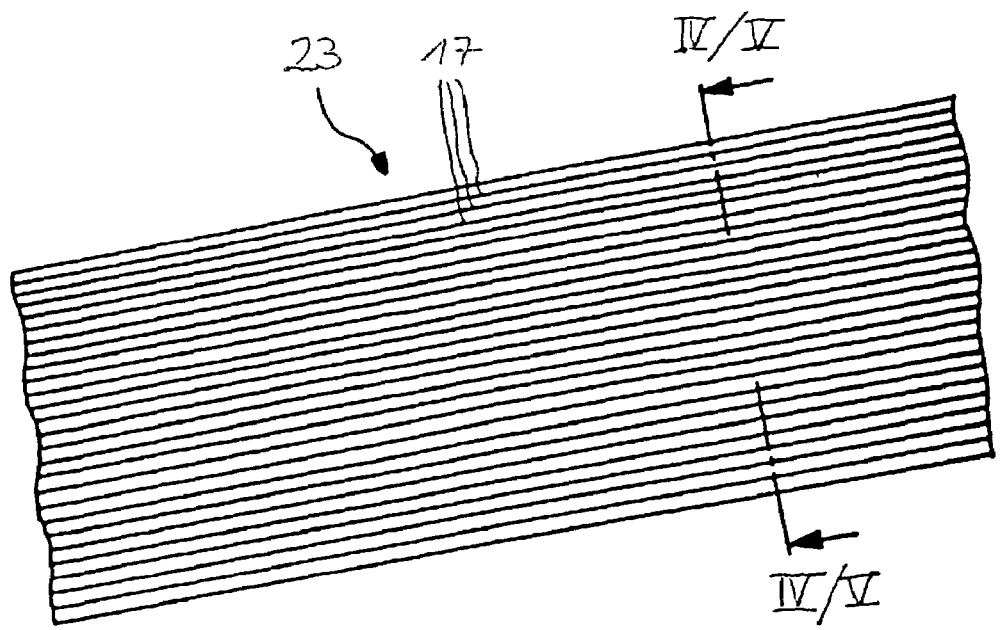
FIG. 3 is a fragmentary, plan view of a sheet metal layer of a sleeve with microstructures.

FIG. 3 shows a sleeve sheet metal layer 23 for producing the sleeve 13 with microstructures 17. After the sleeve sheet metal layer 23 has been deformed into a sleeve 13, the microstructures 17, which run parallel to one another, can be oriented as desired.

Figure 6:
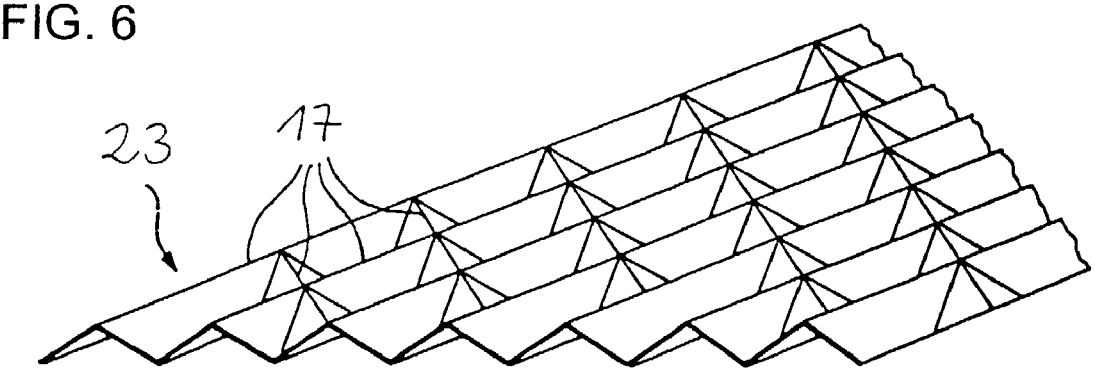
FIG. 6 is a fragmentary, perspective view of a sheet metal layer of the sleeve with microstructures which intersect one another.
Figure 4:
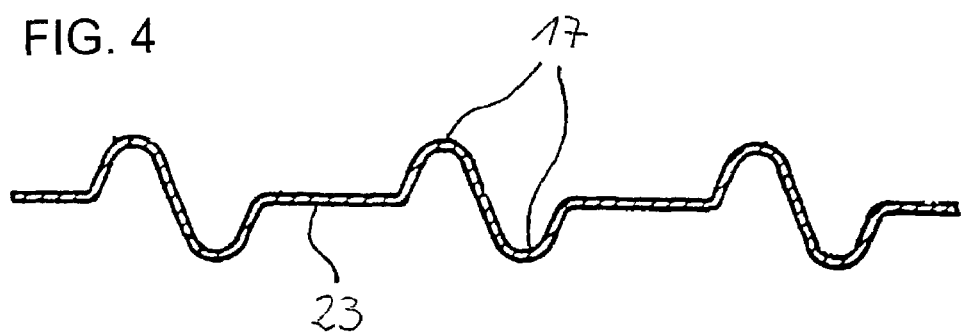
FIG. 4 is an enlarged, sectional view of an exemplary embodiment of the sheet metal layer of the sleeve with microstructures.
Figure 5:
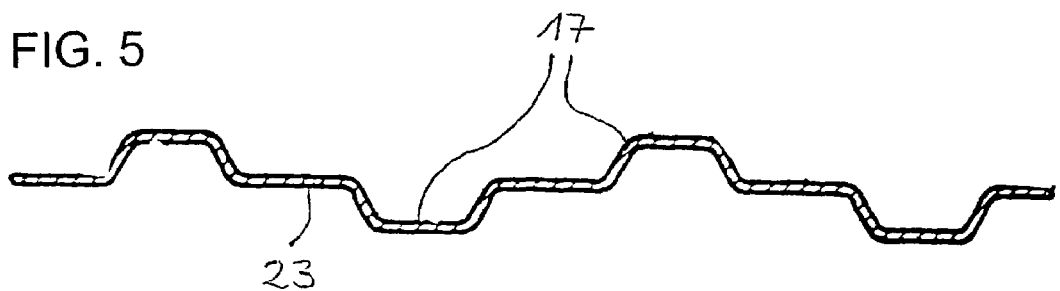
FIG. 5 is an enlarged, sectional view of a further exemplary embodiment of a sheet metal layer of the sleeve with microstructures.

FIGS. 4 and 5 show sectional views of two exemplary embodiments of sleeve sheet metal layers 23 with differently constructed microstructures 17. FIG. 6 is a perspective illustration of another sleeve sheet metal layer 23 with microstructures 17 which intersect one another.

Figure 7:
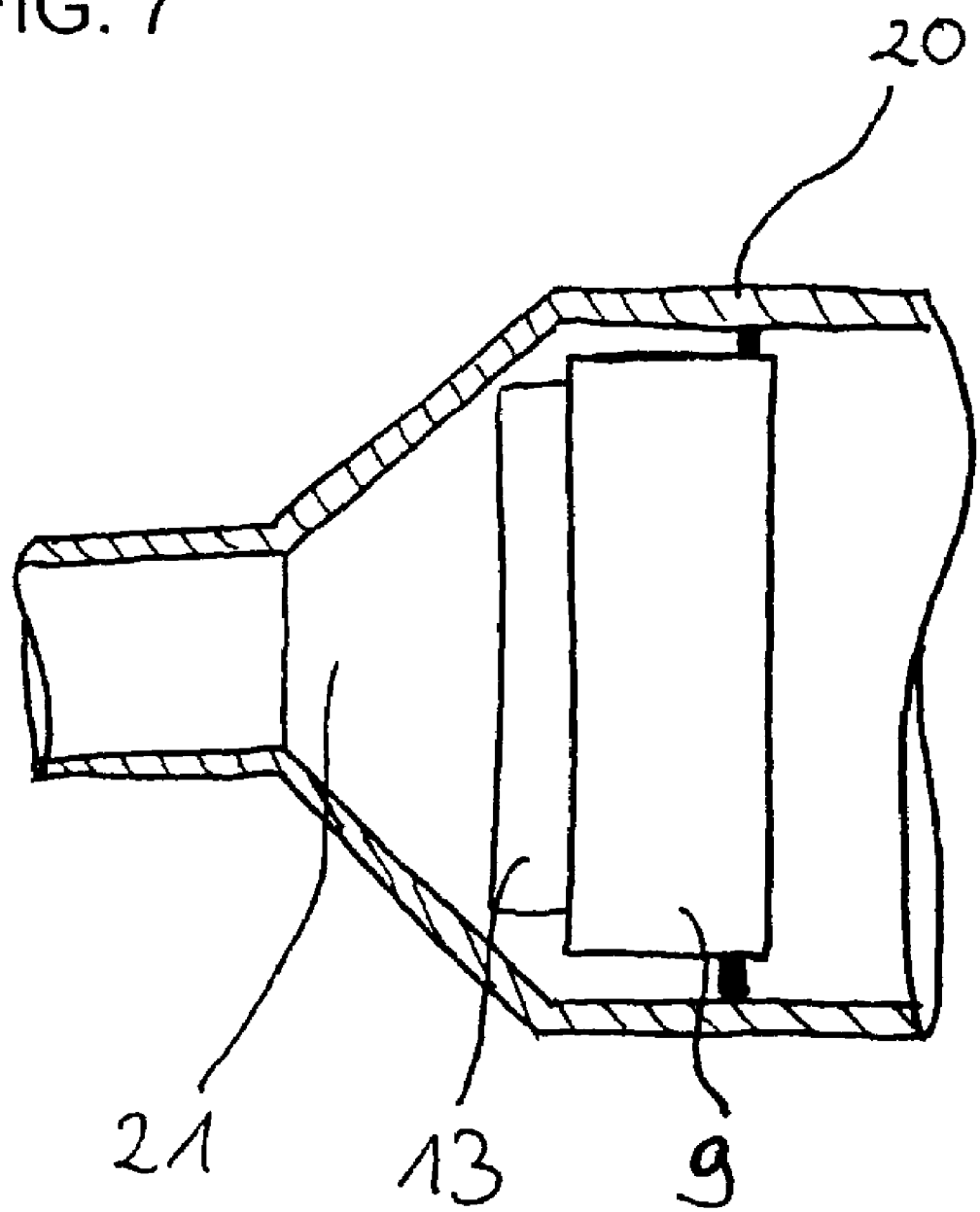
FIG. 7 is a fragmentary, partly-sectional view of catalyst carrier body according to the invention in a catalytic converter.

FIG. 7 shows a diagrammatic view of a configuration of a catalyst carrier body according to the invention in a catalytic converter, in particular for cleaning exhaust gas from an internal combustion engine. The catalytic converter includes a catalyst carrier body with a sleeve 13, a honeycomb body 1 and a tubular jacket 9, as well as a housing 20 with a gas inlet 21. The hot exhaust gas flows through the gas inlet. The catalytic converter is disposed close to the gas inlet 21, with the sleeve 13 being directed toward the gas inlet 21. In this way, the maximum possible freedom of expansion is granted to that section 7 of the catalyst carrier body which is subjected to the highest thermal loads. The tubular jacket 9 is connected to the housing 20 by a joining technique. The preferred joining technique is brazing. However, a sintering process or even welding may be used.

A catalyst carrier body of this type is particularly well suited for installation close to the engine in an exhaust system of a motor vehicle, since it is able to withstand the extremely high thermal and dynamic loads which prevail in that region for a prolonged period.

What is claimed is:

1. A catalyst carrier body, comprising:
   a honeycomb body formed of sheet-metal layers and having an axial extent, an outer region, end surfaces and a projecting section, said sheet-metal layers at least partly structured to form passages in said honeycomb body through which an exhaust gas can flow, and said sheet-metal layers having radially outwardly lying end regions;
   a tubular jacket having an edge, an axial span shorter than said axial extent of said honeycomb body, and at least one axial partial-region joined to said honeycomb body, said projecting section of said honeycomb body projecting beyond said edge of said tubular jacket; and
   a sleeve disposed on said outer region of said honeycomb body in the vicinity of one of said end surfaces and completely and continuously surrounding said projecting section of said honeycomb body, said sleeve having an axial length shorter than said axial extent of said honeycomb body, said sleeve having an inner shell surface joined to said end regions of said sheet-metal layers at said end surfaces of said honeycomb body, and said sleeve having a thickness of between 0.02 and 0.1 mm.

2. The catalyst carrier body according to claim 1, wherein said sleeve extends as far as one of said end surfaces of said honeycomb body.

3. The catalyst carrier body according to claim 1, wherein at least 10 mm to 20 mm of said axial length of said sleeve projects beyond said edge of said tubular jacket.

4. The catalyst carrier body according to claim 1, wherein at most 20 mm to 10 mm of said axial length of said sleeve is surrounded by said tubular jacket.

5. The catalyst carrier body according to claim 1, wherein said sleeve is joined to said tubular jacket.

6. The catalyst carrier body according to claim 1, wherein said sleeve is joined to said tubular jacket by high-temperature vacuum brazing.

7. The catalyst carrier body according to claim 1, wherein said sleeve has at least one microstructure.

8. The catalyst carrier body according to claim 7, wherein said at least one microstructure encircles said sleeve.

9. The catalyst carrier body according to claim 7, wherein said at least one microstructure includes a plurality of microstructures intersecting one another.

10. The catalyst carrier body according to claim 7, wherein said sleeve has an outer shell surface, and said at least one microstructure is disposed only in direction of said outer shell surface.

11. The catalyst carrier body according to claim 1, wherein said honeycomb body is brazed to said tubular jacket.

12. The catalyst carrier body according to claim 1, wherein said honeycomb body is brazed to said tubular jacket by high-temperature vacuum brazing.

13. The catalyst carrier body according to claim 1, wherein said sleeve has an edge, said inner shell surface has an encircling circumferential region, and said radially outer end regions of said sheet-metal layers at said end surfaces of said honeycomb body are brazed to said sleeve in the vicinity of said edge of said sleeve and at least in said encircling circumferential region of said inner shell surface.

14. The catalyst carrier body according to claim 13, wherein said radially outer end regions of said sheet-metal layers are high-temperature vacuum brazed to said sleeve.

15. The catalyst carrier body according to claim 1, wherein said axial span of said tubular jacket and said axial length of said sleeve together are equal to said axial extent of said honeycomb body.

16. A catalytic converter, comprising:
a housing having a gas inlet; and
a catalyst carrier body disposed in said housing and including:
   a honeycomb body formed of sheet-metal layers and having an axial extent, an outer region, end surfaces and a projecting section, said sheet-metal layers at least partly structured to form passages in said honeycomb body through which an exhaust gas can flow, and said sheet-metal layers having radially outwardly lying end regions;
   a tubular jacket having an edge, an axial span shorter than said axial extent of said honeycomb body, and at least one axial partial-region joined to said honeycomb body, said projecting section of said honeycomb body projecting beyond said edge of said tubular jacket; and
   a sleeve disposed on said outer region of said honeycomb body in the vicinity of one of said end surfaces and completely and continuously surrounding said projecting section of said honeycomb body, said sleeve having an axial length shorter than said axial extent of said honeycomb body, said sleeve having an inner shell surface joined to said end regions of said sheet-metal layers at said end surfaces of said honeycomb body, and said sleeve facing toward said gas inlet, and said sleeve having a thickness of between 0.02 and 0.1 mm.

17. The catalytic converter according to claim 16, wherein said catalyst carrier body is disposed in the vicinity of said gas inlet.

18. The catalytic converter according to claim 16, wherein said tubular jacket of said catalyst carrier body is joined to said housing.

19. The catalyst carrier body according to claim 1, wherein said sleeve compensates for thermal loading due to freedom of expansion and allows thermal expansion of said projecting section of said honeycomb body under thermal load while avoiding thermal stresses.

20. The catalytic converter according to claim 16, wherein said sleeve compensates for thermal loading due to freedom of expansion and allows thermal expansion of said projecting section of said honeycomb body under thermal load while avoiding thermal stresses.

* * * * *